_United States Patent_ [19]

Heideman et al.

[11] Patent Number: 4,482,035

[45] Date of Patent: Nov. 13, 1984

[54] SHOCK ABSORBER

[76] Inventors: Robert Heideman, 34316 Barton, Westland, Mich. 48185; Richard G. Dressell, Jr., 14609 Stonehouse, Livonia, Mich. 48154

[21] Appl. No.: 422,044

[22] Filed: Sep. 23, 1982

[51] Int. Cl.³ .......................... F16F 9/48; F15D 1/06; F16K 31/524
[52] U.S. Cl. ...................................... 188/287; 138/42; 138/43; 188/285; 188/318; 251/259; 251/344
[58] Field of Search ............... 188/287, 285, 286, 315, 188/318; 267/8 R, 34, 137, 140.4; 251/259, 344, 345; 137/625.3, 625.32; 74/571 M; 138/45, 46, 42, 43; 16/51, 52

[56] References Cited

U.S. PATENT DOCUMENTS

| | | | |
|---|---|---|---|
| 3,425,522 | 2/1969 | Gryglas | 188/315 |
| 3,478,846 | 11/1969 | Germond | 188/287 |
| 3,510,117 | 5/1970 | Scholin et al. | 188/287 |
| 3,598,206 | 8/1971 | Hennells | 188/287 |
| 3,693,767 | 9/1972 | Johnson | 188/287 |
| 3,840,097 | 10/1974 | Holley | 188/287 |
| 4,059,175 | 11/1977 | Dressell, Jr. et al. | 188/287 |
| 4,153,145 | 5/1979 | Ellis et al. | 188/315 |
| 4,298,101 | 11/1981 | Dressell, Jr. et al. | 188/315 |
| 4,321,987 | 3/1982 | Dressell, Jr. et al. | 188/285 |

Primary Examiner—Duane A. Reger
Assistant Examiner—Robert J. Oberleitner
Attorney, Agent, or Firm—Krass & Young

[57] ABSTRACT

A shock absorber for providing a linear decelerating force to a machine part by means of a piston which forces fluid through a series of orifices formed by co-action of holes in the piston cylinder and holes formed in a sleeve forming a metering tube which fits over the cylinder. An infinite number of adjustments in the shock absorber characteristics is achieved by moving the holes in the metering tubes in orbital pattern relative to the holes in the cylinders.

10 Claims, 4 Drawing Figures

SHOCK ABSORBER

TECHNICAL FIELD

This invention relates to shock absorber devices for linearly decelerating a machine part by imposing a relatively constant force to the part over the stroke of the device and, more particularly, to a device wherein the constant decelerating force may be adjusted for use with machine parts having differing weights and velocities.

BACKGROUND ART

Shock absorbers which force fluid through a restricted orifice to convert the kinetic energy of a moving part into an increase in the thermal energy of the fluid are commonly used on machines. The smoothest deceleration of the moving part is obtained by absorbers which offer a constant resistive force to the motion over the total length of the deceleration.

One class of such devices employ a piston connected to the machine part and movable within a cylinder having a closed end. A series of exponentially spaced holes are formed along the length of the cylinder wall and the cylinder is supported within a housing filled with fluid. As the piston is forced into the cylinder by motion of the machine part, the fluid is forced through the holes and the kinetic energy of the part is converted into thermal energy of the fluid. As the piston moves down the cylinder it successively closes off the holes so that the force imposed on the load is maintained relatively constant resulting in a linear deceleration of the moving part.

The force imposed on the part is a function of the configuration of the fluid orifices, and linear decelerators of this class have been designed wherein the orifice configuration may be varied to accommodate the device for use with parts having varying weights and kinetic energy. One of the most common approaches is to provide grooves in a tubular sleeve fitting over the cylinder. The grooves in the sleeve cooperate with the holes in the cylinder to define the fluid orifices. The angular position of the sleeve on the cylinder may be adjusted to vary the orifice configuration and, thus, the resistance provided to the load. Representative examples of the so-called "groove-on-hole" shock absorbers are disclosed in commonly assigned U.S. Pat. Nos. 4,059,175; 4,298,101; and 4,321,987, as well as the disclosures in non-related U.S. Pat. No. 3,425,522 to Gryglas and U.S. Pat. No. 3,693,767 to Johnson. While devices having this orifice configuration have generally proved satisfactory in operation, there is a tendency for leakage to occur through the seals between the cylinder and the sleeve. The groove design provides a potentially shorter lower resistance path for oil to seep from the holes in the cylinder through the mutually facing walls of the cylinder and the sleeve. This leakage disturbs the optimum device characteristics since the fluid flow is not constrained to flow solely through the preselected orifice configuration.

As exemplified by U.S. Pat. No. 3,510,117 to Scholin et al and U.S. Pat. No. 3,840,097 to Holly, the prior art does disclose the use of holes instead of grooves in the outer sleeve. The Holly patent employs a plurality of triangularly disposed openings in the inner cylinder and the sleeve contains an axially extending row of openings therethrough. The cylinder is rotated radially to selectively vary the number of overlapping openings to adjust the energy absorbing capacity of the device. This construction, like the groove-on-hole design, is subject to leakage due to the multitude of potential leakage paths provided by the nonused openings in the triangular arrangement in the cylinder. In the Scholin et al patent, a relatively complex construction is provided for axially moving the outer sleeve to a finite number of positions relative to the holes in the cylinder. As a consequence, there is a limited number of preset orifice configurations thereby limiting the ability of the device to be individually tailored to the precise characteristics of the moving part, and the device is relatively expensive to manufacture.

SUMMARY OF THE INVENTION

Pursuant to the present invention, a shock absorber design is provided with manually rotatable means for moving the sleeve in an orbital pattern relative to the cylinder to infinitely adjust the size of the orifice openings between the cylinder and surrounding sleeve. In the preferred embodiment, a manually rotatable shaft has an off center cam formed in its lower end engaging an aperture in the sleeve. The resulting orbital pattern of the sleeve enables an extremely fine adjustment of the orifice size to individually tailor the shock absorber characterisitics for wide range of different weights and kinetic energy of moving parts to which it is connected. As the cam is rotated from the fully closed position, a very small change in the orifice overlap size is experienced per degree of rotation of the cam. Consequently, sensitive adjustments can be easily made. The rate of change of orifice size per degree of rotation increases with further cam rotation. The cam can be rotated 360° changing orifice size from a closed to fully overlap condition every 180° of rotation. Means are advantageously provided for holding the cam in a fixed position once the desired orifice size has been achieved.

The shock absorber device of the present invention can be made relatively inexpensively while providing a high degree of flexibility to tailor its characteristics to individualized applications. The sleeve may be provided with grooves but better results are experienced with a "hole-on-hole" design. The rate of orifice size change per degree of cam rotation can be easily modified merely by changing the relative circumferential position of the holes in the sleeve and cylinder. All of these advantages are obtained while at the same time minimizing the leakage problem associated with conventional groove-on-hole designs.

BRIEF DESCRIPTION OF THE DRAWINGS

These and other advantages of the present invention will become apparent to one skilled in the art by reading the following specification and by reference to the drawings in which.

DESCRIPTION OF THE PREFERRED EMBODIMENT

Figure 1:
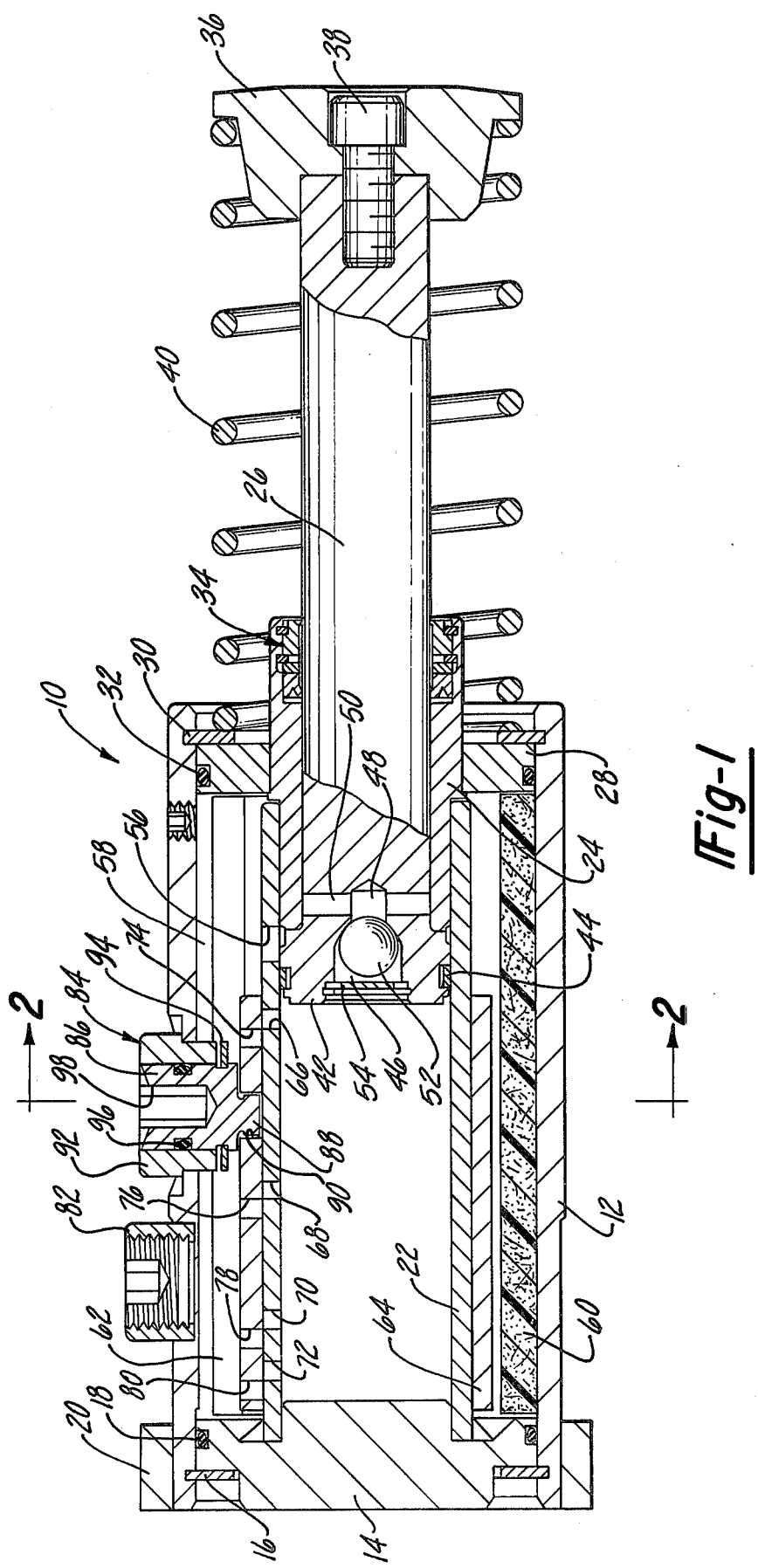
FIG. 1 is a partial sectional view of a shock absorber made according to the present invention, the section taken along the longitudinal axis thereof.
Figure 2:
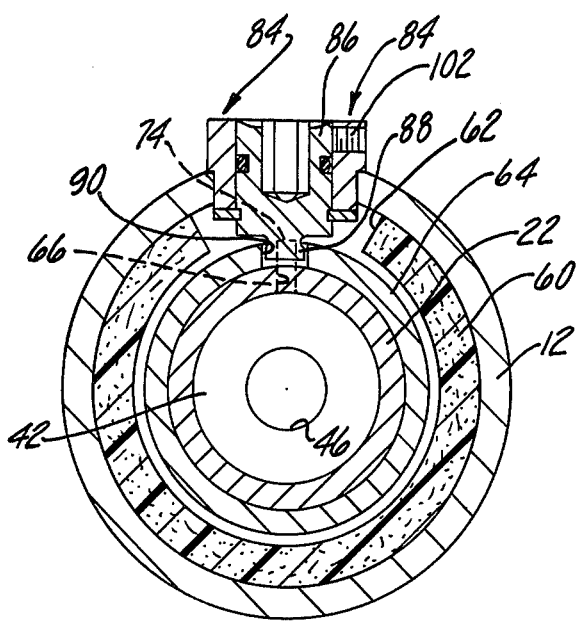
FIG. 2 is a cross-sectional view taken along lines 2—2 of FIG. 1.

The shock absorber 10 of the present invention is constructed about a cylindrical outer tube 12. One end of the tube 12, which shall be hereinafter termed the rear end, is closed off by an end cap 14 secured to the inner wall of tube 12 by retaining ring 16, with O-ring 18 providing a fluid seal therebetween. A radial extending flange 20 may be conveniently employed to mount the shock absorber 10 to a suitable supporting surface.

A tubular metering cylinder 22 is supported at its rear end on shoulders on cap 14 and projects forwardly into tube 12. The outer diameter of cylinder 22 is substantially smaller than the inner diameter of tube 12 so that a volume is formed between them. The forward inner wall of cylinder 22 engages a cylindrical sleeve bearing 24 adapted to slidingly support an elongated piston rod 26 that projects out of forward end of the assembly. Bearing 24 is held in place by way of an annular bushing 28 fixed relative to the outer tube 12 by retainer ring 30. O-ring 32 provides a fluid seal between bushing 28 and outer tube 12. An annular subassembly generally designated by the numeral 34 provides sealing engagement between piston rod 26 and the forward inner end of bearing 24 in a manner known in the art.

At its forward end the piston rod 26 carries a button 36 secured by a screw 38 threaded in a hole at the end of the piston rod. Button 36 serves to bear against a machine part to be controlled by the shock absorber 10. A spiral spring 40 extends between the rear side of button 36 and retaining ring 30 thereby acting to return the piston rod 26 to its normal extended postion after the machine part is moved away from the shock absorber.

A piston head 42 is formed integrally with the rear end of rod 26. A groove on the outer diameter of the piston head 42 carries a piston ring 44 bearing against the inner diameter of cylinder 22. Piston head 42 is formed with a central aperture 46 in its rear end and communicating at its forward end with a central cavity 48. Cavity 48, in turn, communicates with a vertically extending bore 50. The concave surface between the larger aperture 46 and smaller cavity 48 acts as a seat for a ball check valve 52. A valve retainer is provided rearwardly of the ball by way of retainer ring 54. When the piston moves rearwardly under the influence of a force exerted on button 36 by a machine part, the cavity 48 is sealed by the ball 52 and when the piston moves in the forward direction under the force of return spring 40, a free flow path is established through aperture 46, cavity 48 and bore 50.

Bore 50 communicates with an opening 56 in the forward end of cylinder 22. Opening 56 is in further communication with the annular volume 58 between the inner wall of tube 12 and outer wall of cylinder 22. Pursuant to a feature of this invention a single accumulator pad 60 substantially fills the entire volume 58. In this embodiment, pad 60 is formed of cellular plastic which may be filled with nitrogen to give it a high degree of resilience and includes a slot 62 providing clearance for the adjuster mechanism and metering orifices as will be explained.

A sleeve 64 surrounds the outer diameter of cylinder 22. Four straight sided circular holes 66–72 are formed radially through the wall of cylinder 22. In this embodiment, the four holes 66–72 are in longitudinal alignment with one another and their respective spacings are arranged at exponentially decreasing distances in the direction of the rear of cylinder 22. Holes 66–72 cooperate with four straight sided circular holes 74–80 formed within the wall of sleeve 64. The adjacent pairs of holes in the sleeve and cylinder cooperate to form metering orifices of infinitely adjustable size.

In FIG. 1, there is no overlap shown between the respective holes in the cylinder 22 and sleeve 64. However, in normal operation there is a certain amount of overlap, the size of which is adjusted to accommodate the type of moving part to which shock absorber 10 is connected. The interior of shock absorber 10 is filled with noncompressible hydraulic fluid by way of port 82. The piston button 36 is positioned to receive the impact of the moving part and exert a linear decelerating force on that part. During rearward motion of the piston head 42, fluid is forced through the metering orifices created by the interaction of the holes in cylinder 22 and sleeve 64. The metering orifices are successively closed off as the piston head 42 moves rearwardly down the cylinder thereby maintaining the decelerating force relatively constant. The fluid moves out of the holes in the cylinder and into the accumulator pad 60. When the machine part moves away from the shock absorber, the spring 40 returns the piston to its forward position and the valve in the piston formed by ball 52 moves against the valve retainer 54 so that fluid can freely flow from the accumulator pad 60 back into the interior volume of the cylinder. Special attention should now be directed to the adjuster mechanism generally designated by the numeral 84. A stub shaft 86 has an off center cam portion 88 formed at its lowermost end. Cam 88 fits within a conforming pocket provided, in this embodiment, by way of an aperture 90 within sleeve 64.

Shaft 86 is mounted for rotation by way of a surrounding collar 92 fixed to outer tube 12. A retaining ring 94 lies within a transversely extending radial groove in shaft 86 above cam 88 to restrict upward movement of the shaft. A fluid seal between shaft 86 and collar 92 is provided by way of O-ring 96. A socket 98 formed along the vertical center line of shaft 86 is adapted to receive a suitably conforming wrench for rotating the shaft.

Figure 3:
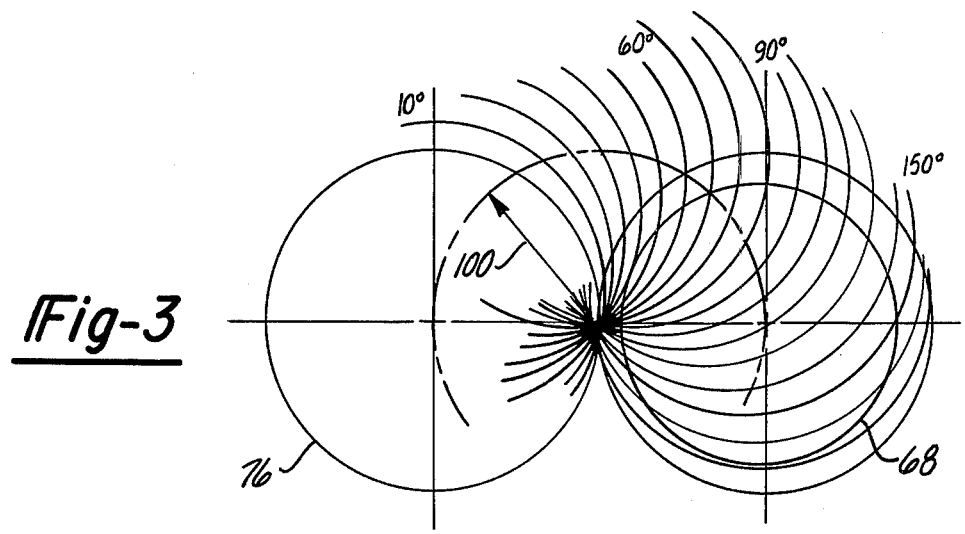
FIG. 3 is a conceptual view which diagramatically illustrates the orbiting movement of a hole in the sleeve with respect to a fixed inner hole in the cylinder falling within the teachings of the present invention.
Figure 4:
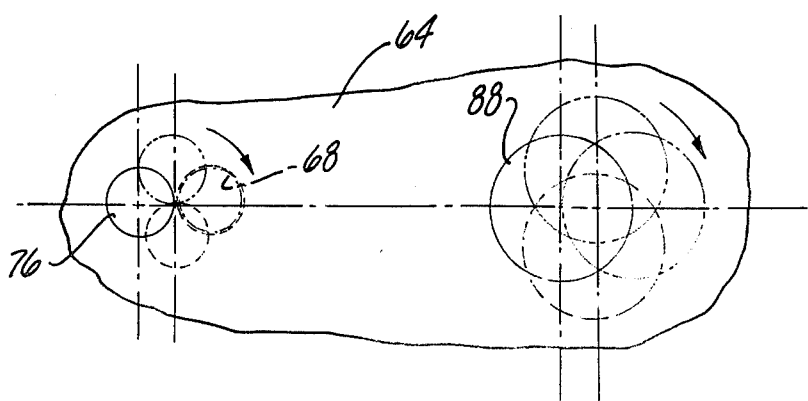
FIG. 4 is another conceptual view diagramatically illustrating orbital movement of a hole in the sleeve in relationship to rotation of the cam utilized in the preferred embodiment.

Reference to FIGS. 3 and 4 will aid in the understanding of the meter size adjustment operation of the present invention where only one metering orifice defined by holes 68 and 76 are shown. However, the other metering orifices are likewise adjusted. In this embodiment, the center points of the holes 74–80 in sleeve 64 are located on the same longitudinal axis as cylinder holes 66–72 when they are in the closed position shown in FIG. 1. Sleeve holes 74–80 are slightly larger in diameter than cylinder holes 66–72. The sleeve holes are also displaced axially so that in the fully closed position the tangents of the sleeve and cylinder holes are displaced from each other a small distance so as to insure that no leakage occurs. When shaft 86 is rotated in a clockwise manner the off center cam 88 moves sleeve 64 both axially and radially with respect to fixed cylinder 22. This creates an orbiting pattern for sleeve holes 74–80 relative to their adjacent pair of cylinder holes 66–72. The orbiting motion of the sleeve holes causes their center points to travel about the radial designated by the numeral 100 in FIG. 3. When the shaft 86 is rotated 180° there is a full overlap created between the holes.

However, the rate of change of overlap is not proportional to the degree of shaft rotation. With the arrangement shown in FIG. 3 there is very slight incremental change in overlap created between the holes for the first 90° of shaft rotation due to the orbital movement of sleeve 64. As a result, very fine adjustment of the metering orifice size can be obtained. This increased sensitivity permits the shock absorber characteristics to be precisely tailored to the weight, kinetic energy, and other factors associated with the part to be decelerated. The ability to "fine tune" the shock absorber is especially advantageous for fast moving heavy parts where the need for small metering orifice sizes is especially pronounced.

As rotation of the shaft 86 continues beyond about 90° the rate of change of overlap increases to provide gross adjustment of the metering orifice size. In this embodiment, shaft 86 may be rotated completely throughout 360° with the rate of change of overlap varying in a reverse manner. Once the desired overlap has been achieved, a set screw 102 may be tightened to hold the shaft 86 in position.

While the holes in the sleeve and cylinder are axially aligned when in the full closed positon they may be angularly displaced relative to one another to vary the adjustment sensitivity as desired. For example, if the cylinder holes 66-72 are moved upwardly and to the right relative to the sleeve holes as shown in FIG. 3, then even greater sensitivity would be experienced during the first degrees of shaft rotation from the closed off position.

Those skilled in the art will appreciate that the construction of the shock absorber of the present invention provides all of the above-stated advantages while at the same time minimizing unwanted leakage. The shock absorber of the present invention may be constructed relatively inexpensively without requiring intricate parts and yet provide a high degree of adjustment capability and still provide excellent results. The simplicity of the shock absorber design of this invention is highlighted by the dual function of the adjuster mechanism. Not only does it create a high degree of orifice size adjustment sensitivity but it also serves to maintain the sleeve in a relatively restricted radial position relative to the cylinder. In other words, it keeps the sleeve from rotating to such a degree that the holes would not align themselves with the cylinder holes.

The orbiting action of the orifice size adjustment feature of this invention may also be employed with "groove-on-hole" designs as well as the "hole-on-hole" design described in connection with the preferred embodiment. For example, the inner wall of sleeve 64 may be provided with square sided annular grooves including drilled holes extending transversely through the wall into volume 58. Such a construction may take advantage of the infinite adjustment provided by the broach teachings of this invention although it may be more suspectible to leakage in some circumstances.

Therefore, while this invention has been described in connection with a specific example thereof, no limitation is intended thereby except as defined by the following claims.

We claim:

1. In a shock absorbing device for absorbing kinetic energy of a moving member so as to decelerate the member, said device including a tubular cylinder with a plurality of spaced holes formed in its wall, a metering tube in the form of a sleeve with a number of holes equal to the number of cylinder holes extending through its wall, and a piston slidable with the cylinder adapted to be contacted by the moving member, the improvement comprising:
   means for creating simultaneous relative radial and axial movement between said sleeve and said cylinder so that the holes therein move relative to one another in an orbital pattern whereby the size of a metering orifice defined by the holes may be adjusted.

2. The improvement of claim 1 wherein said means comprises:
   a manually rotatable adjuster member extending normally to the sleeve, and means for converting rotation of said adjuster member into combined radial and axial movement of said sleeve relative to the cylinder.

3. A shock absorbing device for absorbing kinetic energy of a moving member so as to decelerate the member, said device including a tubular cylinder with a plurality of spaced holes formed in its wall, a metering tube in the form of a sleeve with an interior wall surrounding the cylinder and having a number of holes equal to the number of cylinder holes extending through its wall, a piston slidable within the cylinder adapted to be contacted by the moving member, and an outer tube surrounding the sleeve, the improvement comprising:
   means for creating relative movement between said sleeve and said cylinder so that the holes therein move relative to one another in an orbital pattern whereby the size of a metering orifice defined by the holes may be adjusted, said means comprising a rotatable shaft extending normally through the outer tube and having an off center cam formed in lower portions thereof engaging said sleeve.

4. The improvement of claim 3 wherein said sleeve includes a normally extending aperture through its wall conforming to the cam.

5. The improvement of claim 4 wherein said shaft is mounted for rotation within a collar, with the collar including means for selectively preventing rotation of said shaft.

6. The improvement of claim 5 wherein said rotation preventing means comprises a set screw.

7. The improvement of claim 3 wherein upper portions of said shaft include a socket for receiving a wrench.

8. A shock absorbing device for absorbing kinetic energy of a moving member so as to decelerate the member, said device comprising;
   an outer tube having an end cap closing off one end of the tube;
   an inner tubular cylinder having a plurality of holes formed in its wall which are spaced relative to one another along the longitudinal axis of the cylinder, one end of the cylinder being supported by said end cap;
   an annular bearing having an inner surface adapted to receive a piston rod with a piston head slidably positioned within the cylinder, the opposite end of the cylinder being supported by the annular bearing;
   a sleeve having a number of holes formed in its wall equal to the number of holes formed in the cylinder;

a substantially continuous annular volume defined by inner surfaces of the outer tube and the outer surface of the sleeve;

a single accumulator pad in the volume;

a shaft extending transversely through the outer tube having an off center cam formed in lower portions thereof received by a conforming aperture in the sleeve, said shaft including a socket in upper portions thereof for receiving a wrench for rotating same;

whereby rotation of the shaft causes said sleeve to move in an orbital pattern relative to the cylinder to adjust the amount of overlap between the holes in the cylinder and the sleeve.

9. A shock absorbing device for absorbing kinetic energy of a moving member so as to decelerate the member, said device comprising:

a cylinder adapted to slideably receive a piston for contacting the moving part;

a sleeve surrounding the cylinder;

means in the sleeve and cylinder cooperating to define a plurality of metering orifices; and an adjustment mechanism connected to the sleeve for moving it in a radial and axial pattern relative to the cylinder for adjusting the size of the metering orifices.

10. The device of claim 9 wherein the metering orifices are defined by a plurality of spaced holes in the sleeve and the cylinder.

* * * * *